March 20, 1956     R. H. CHERRY ET AL     2,738,678
LIQUID MANOMETERS

Filed Oct. 21, 1952     3 Sheets-Sheet 1

INVENTORS.
ROBERT H. CHERRY
GERARD M. FOLEY
BY
Woodcock and Phelan
ATTORNEYS

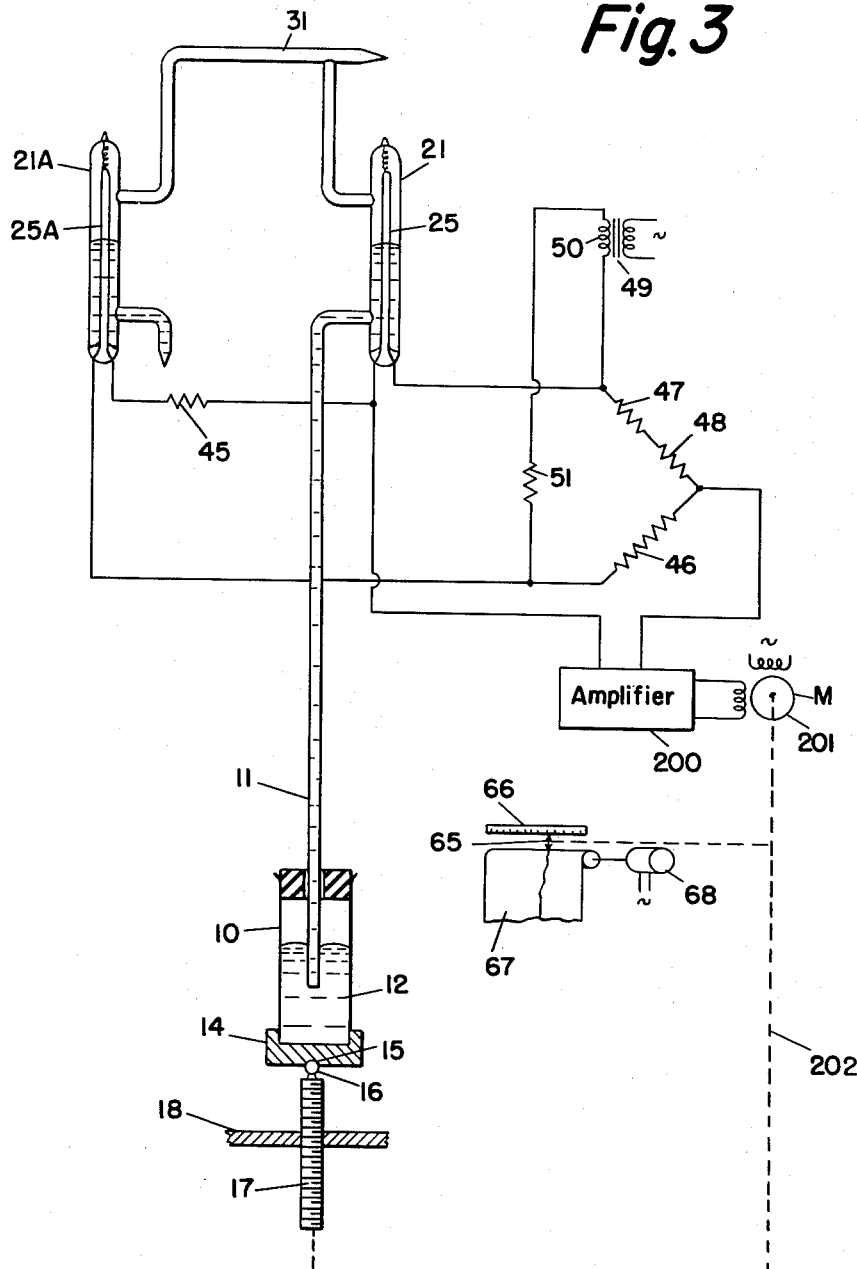

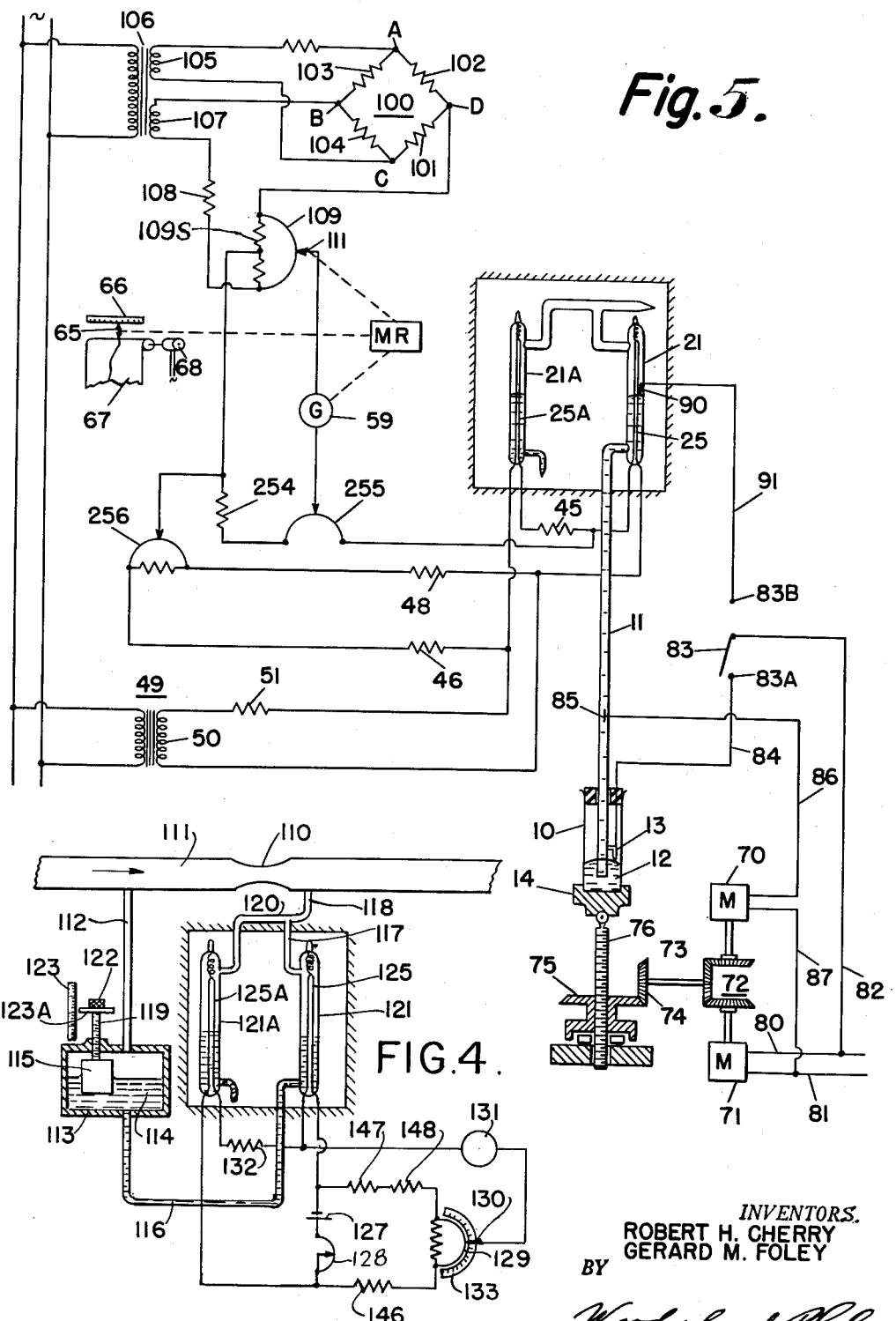

United States Patent Office 2,738,678
Patented Mar. 20, 1956

2,738,678

LIQUID MANOMETERS

Robert H. Cherry, Upper Moreland Township, Montgomery County, and Gerard M. Foley, Philadelphia, Pa., assignors to Leeds and Northrup Company, Philadelphia, Pa., a corporation of Pennsylvania Application October 21, 1952, Serial No. 315,948

7 Claims. (Cl. 73—398)

This invention relates to liquid manometers of the type provided with electrical impedance means variably immersed in the manometer liquid and whose variations in effective impedance are a measure of the pressure applied to the liquid column.

Usually in previous devices of this type, a bare resistance wire extends through and above a column of mercury and is connected in a measuring circuit. The variation, with pressure, in height of the mercury column varies the electrical shunting effect of the mercury upon the wire so that the effective resistance of the device varies with the applied pressure. Such devices are unsatisfactory because, inter alia, the total resistance and resistance per unit of length of the wire does not remain fixed but varies with use because of contamination of the wire by the mercury. Specifically, the amalgam coating formed on the wire destroys the calibration and invalidates the measurements.

In accordance with preferred forms of the present invention, for measurement of absolute or differential pressures, there is provided at least one pair of similar cells each including an electrically-heated, temperature-sensitive resistance element which extends through and above a column of liquid, but is electrically insulated therefrom although in good heat-transfer relation thereto. The heat loss for the lower submerged portion of the resistance element is substantially different from the heat loss from the upper portion so that the cell resistance is determined by the level of the liquid without electrical contact between the resistance element and the liquid. The cells of the pair are interconnected above the liquid to insure similarity of the ambient conditions to which the unsubmerged portions of the impedance elements are exposed and the liquid levels of the cells are preferably adjusted for equality at the mean value of the range of pressures to be measured. The cell resistances are included in a network, such as a Wheatstone bridge, whose unbalance corresponds with deviation from the pressure for which the liquid level of the cells are equal, the aforesaid construction and interconnection of the cells providing a first order compensation for variations in ambient temperature.

In some embodiments of the invention, the balance of the cell bridge is restored at the existing pressure by automatic adjustment of the liquid level with concurrent repositioning of an indicating or recording element, whereas in other embodiments, the bridge balance is not restored, the unbalance being used either to actuate a deflection instrument or as the input signal to a self-rebalancing potentiometer which measures the unbalance and concurrently repositions an indicating or recording element in accordance with the unknown pressure.

The invention further resides in features of construction, combination and arrangement hereinafter described and claimed.

For a more detailed understanding of the invention and for illustration of preferred embodiments thereof, reference is made to the accompanying drawings in which:

Fig. 3 is a schematic representation of a modification of Fig. 1, particularly illustrating an automatic rebalancing system for said manometer;

Fig. 4 is a schematic representation of a differential-pressure measuring manometer constructed in accordance with the present invention; and Fig. 5 is a schematic representation of a modification of the system illustrated in Fig. 3 which includes a temperature compensating circuit.

Figure 1:
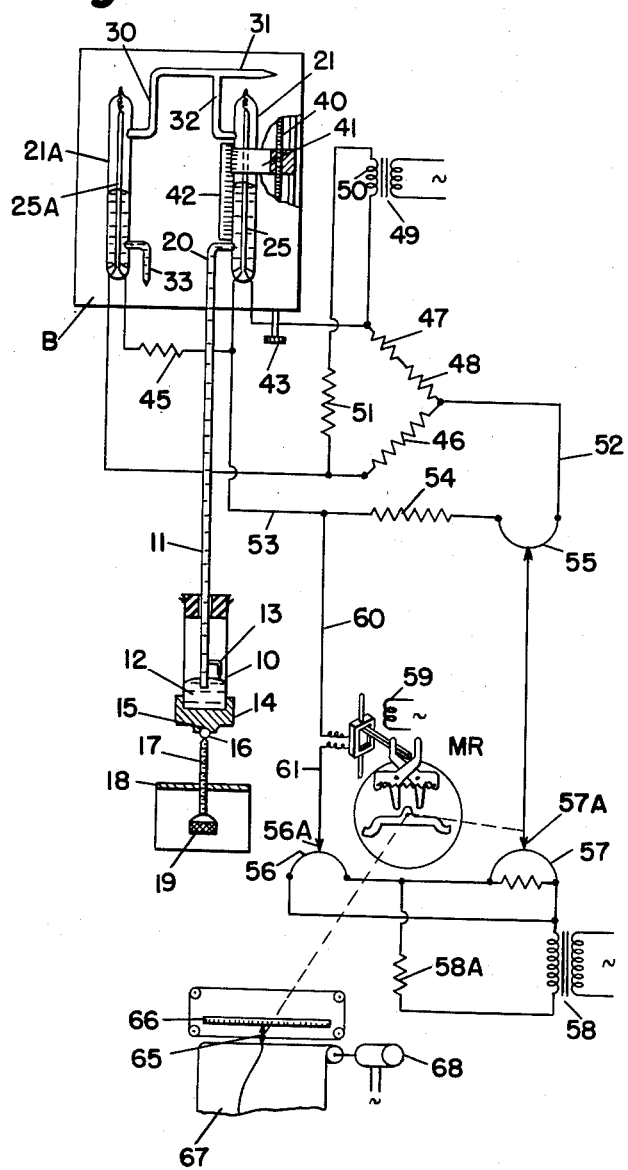
Fig. 1 is a schematic representation of one form of the invention as applied to a manometer of the type used for measuring absolute pressures and generally designated as a Fortin barometer.
Figure 2:
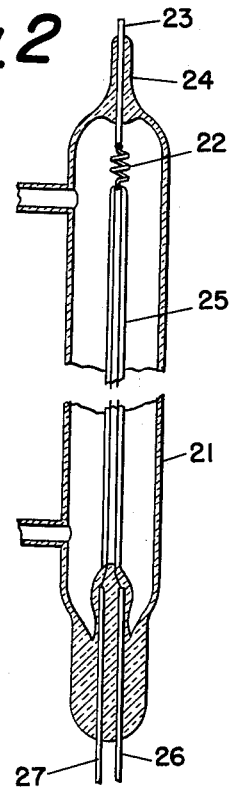
Fig. 2 is a cross-sectional view of the upper portion of the manometer tube of Fig. 1, particularly illustrating the preferred mounting of the resistance element in said manometer tube.

Referring to Fig. 1, the present invention is illustrated as applied to a Fortin barometer which comprises a reservoir 10 mounted for vertical adjustment with respect to the lower end of a measuring tube 11. As distinguished from conventional Fortin barometers, the measuring tube 11 has interconnected therewith a measuring cell 21 which may be of the type disclosed in Frederick Patent No. 2,045,670 connected by a transition section 20 to the measuring tube 11. As illustrated in Fig. 2 and as more fully described in the aforesaid Frederick patent, a resistance wire element 25, comprising a single loop of wire, extends longitudinally or axially of the cell 21. The resistance wire element 25 is of conductive material, such as platinum, having a substantial temperature coefficient of resistance and is coated with glass or equivalent so that the wire and the manometer liquid are electrically isolated but are thermally conductive with respect to each other.

As in a standard barometer, the barometer pressure applied to the mercury 12 in reservoir 10 establishes the height of the column of liquid in tube 11 and cell 21 and so varies that height in accordance with changes in magnitude of the absolute pressure of the atmosphere. With the upper end of cell 21 evacuated through tubes 32 and 31, the mercury or other manometer liquid will rise in cell 21 submerging the lower portion of the resistance element 25 to extent dependent upon the barometric pressure. The sensitive element 25 is connected into an electrical measuring circuit by platinum terminals 26 and 27 passing through the lower end of cell 21. With the resistance element 25 heated from a suitable source of power, its effective resistance will vary in accordance with the liquid level in cell 21.

The pressure measuring cell 21 is so positioned with respect to the reservoir 10 that, for normal atmospheric pressure, approximately one-half of the electrically heated resistance wire 25 is submerged in the liquid with the other half of the resistance wire exposed in the evacuated space above the liquid. With such an arrangement, changes of level of liquid due to changes in pressure will cause a greater percentage change in resistance of wire 25 than if the wire element extended throughout the entire length of the mercury column upwardly of reservoir 10.

Further in accordance with the invention, a comparison cell 21A, similar to cell 21, has its upper end interconnected by tube 30 with the upper end of cell 21. With the lower end of cell 21A sealed off, as by closure of the lower end of elbow 33, and with cell 21A filled approximately half full with same liquid as in cell 21, the standard or comparison cell 21A provides for resistance wire 25A an environment which is essentially identical to that provided in cell 21 for resistance 25. The upper portions of resistance elements 25 and 25A are thus exposed to a common atmosphere of the same composition and temperature so that the rate of heat loss from a unit length of these portions of the resistance elements will be substantially the same for both elements. The heat loss from the upper portion of resistance elements 25 and 25A is primarily due to radiation from the resistance elements and from the glass walls of tubes 21 and 21A. It will, of course, be understood that the "vacuum" will include a small amount of mercury vapor depending upon the temperature of the upper portions of tubes 21 and 21A, but the interconnection 30, 32 insures the same vapor environment to which the unsubmerged upper ends of both resistors 25, 25A are exposed. The lower portions of resistance wires 25 and 25A, electrically insulated from but thermally conductive with respect to the mercury in the tubes 21 and 21A, will have substantially the same thermal conductivity relationships except for changes in the level of mercury in tube 21.

In the system shown in Fig. 1, comparison cell 21A is preferably filled with mercury to cover half the resistance element 25A: mercury is then introduced into reservoir 10 and a vacuum pump connected to the end of tube 31. The upper ends of both cell 21 and cell 21A are evacuated to any desired degree, but preferably only to extent normal for a Fortin barometer. After evacuation of the upper ends of cells 21 and 21A, the tube 31 is sealed off. The standard and measuring cells are mounted within an enclosure B to protect them from external air currents and sudden changes in temperature.

The level indicator pin 13 in reservoir 10 is adjusted by screw 17 so that the vertical distance between the mercury level in reservoir 10 and the center of the measuring wire 25 of cell 21 is equal to the height of the mercury column supported by the average atmospheric pressure at the elevation at which the barometer is to be used. For instance, at sea level, the average atmospheric pressure may be taken to be 760 mm. of mercury, and the vertical height from pin 13 to the center of wire 25 of cell 21 is fixed at this value. After adjustment of the level of mercury 12 so that the meniscus in reservoir 10 just touches the tip of pin 13, the level of mercury in measuring tube 21 will thereafter vary with changes of the atmospheric pressure applied to mercury 12 in reservoir 10 and the ambient temperature of the mercury in tube 11. The effective resistance of cell 21 therefore varies as a function of the barometric pressure: it also varies with the ambient temperature of cell 21, but this latter effect may be compensated by the comparison cell 21A whose effective resistance varies with ambient temperature. Such compensation is complete for a selected level in cell 21, but is less perfect with increasing departure from the level. Such compensation may be attained by connecting the resistances of cells 21, 21A in adjacent arms of a Wheatstone bridge. For more perfect compensation over a wider range, the measuring circuit or bridge includes additional elements now described.

The resistor 47 in one of the other arms may be constructed of nickel, or similar material having a desired temperature coefficient of resistance to compensate the bridge for ambient temperature variations.

In a particular system such as shown in Fig. 1, the unbalance of the bridge for a cell current of 175 milliamperes was 98 millivolts per inch change of level in the measuring cell which is more than 20 times the sensitivity attained with an earlier development not having the compensating cell.

In the particular arrangement shown in Fig. 1, the bridge network is supplied from an alternating current source (not shown) through a transformer 49 having a secondary winding 50 connected to one junction of the bridge between resistor 47 and cell-resistance element 25, while the opposite terminal of transformer secondary 50 is connected through a current-limiting resistor 51 to the junction between resistor 46 and cell-resistance element 25A.

The unbalance of the pressure-sensitive bridge is preferably applied to an output circuit connected by lines 52 and 53 respectively to the output junctions between resistors 46 and 48 and the junction between compensating resistor 45 and resistance element 25. As shown, the output circuit is a potential-dividing network including fixed resistor 54 and slidewire resistor 55.

A selected fraction of the total potential drop across resistors 54 and 55 is balanced by a balanceable potentiometer circuit which includes slidewires 56 and 57 connected to a source of power through transformer 58 and current-limiting resistor 58A. The potentiometer may be of the self-balancing type having a mechanical relay MR, such as disclosed in Squibb Patent No. 1,935,732, which is actuated by an alternating current galvanometer 59 connected by lines 60 and 61, respectively, to line 53 and the adjustable contact 56A of slidewire 56. As more fully described in the Squibb patent, mechanical relay MR operates in response to a deflection of galvanometer 59 to readjust the contact 57A of slidewire 57 to restore balance between the potential difference between contacts 56A, 57A and the effective output of the cell bridge. Simultaneously with adjustment of movable contact 57A, an indicating and recording element 65 is adjusted to indicate the pressure measured by cell 21 visually on scale 66 and to record that pressure on chart 67 which is driven at fixed speed as by synchronous motor 68.

Resistor 45, of manganin for example, is included to compensate for minor differences in the resistance/current characteristics of cells 21, 21A, inherent in the manufacture of cells of this type. Its value is selected, as fully discussed in our copending application Serial No. 200,828, now U. S. Patent No. 2,734,376, to give equal percentage resistance change in the resistance values of the bridge arms respectively including elements 25 and 25A plus resistor 45 when the current in elements 25 and 25A changes because of line voltage variations, with the mercury level in tube 21 adjusted to the same height as the mercury in tube 21A.

In the potentiometer network interconnected to the pressure-sensitive resistance bridge, slidewire 56 is manually adjusted to obtain null deflection of the galvanometer 59, or null input to any equivalent detector, to obtain correspondence between the reading of pointer 65 and the height of mercury column 12. This adjustment is usually and preferably done for equal levels in cells 21, 21A. Slidewire 55 is manually adjustable for selection of the range of measurement, permitting any predetermined fraction of the unbalance voltage from the pressure-detecting bridge to be balanced against the output of the potentiometer.

As in a conventional Fortin barometer, the measuring system may be provided with manually adjustable setting-screw 40 adapted to move a vernier member 41 up or down with respect to scale 42 by adjustment of knob 43. The vernier member 41 is manually moved by knob 43 while the operator aligns by eye the bottom of the vernier member 41 with the top of the mercury meniscus. The elevation of the mercury column may then be read at infrequent intervals on scale 42 as as a check of the automatically recorded value.

Referring now to Fig. 3, there is illustrated a modification of the arrangement of Fig. 1 providing greater accuracy of compensation by comparison cell 21A. As distinguished from Fig. 1, the arrangement in Fig. 3 provides for automatic adjustment of reservoir 10 continuously to maintain the level of liquid in cell 21 at a predetermined height to maintain constant, for all conditions of barometric pressure, that portion or percentage of resistor wire 25 which is in contact with the liquid. By so maintaining the level of liquid in cell 21 at a constant value, the insulated resistance wires 25 and 25A are at all times subjected to the same thermal loss relationships with respect to the mercury and to the common atmosphere above it.

In Fig. 3, such automatic leveling adjustment is effected by means including amplifier 200 and drive motor 201 or equivalent. The signal input to amplifier 200 is the unbalance of the pressure-sensitive bridge including the resistance elements 25 and 25A. The sense and magnitude of this unbalance corresponds with the direction and extent of change of the resistance of element 25 with changes in barometric pressure. Reversible motor 201 is energized in response to the output of amplifier 200 and through a suitable mechanical connection designated as 202 drives adjusting screw 17 to re-position reservoir 10 and so adjust the liquid level in cell 21 to attain balance of the measuring network at the existing atmospheric pressure.

The motor 201 also positions indicator 65 with respect to scale 66 and moves a recording pen on chart 67 driven at synchronous speed by motor 68 so to indicate and record the varying atmospheric pressure.

In the arrangement of Fig. 3, the comparison tube 21A provides compensation for variations in ambient temperature because since the level of liquid in cell 21 is maintained constant, the resistances of elements 25 and 25A are at all times equally submerged and so exposed to almost identical heat-loss relationships with respect both to the liquid and to the atmosphere above it.

Referring now to Fig. 4, there is illustrated an arrangement embodying the present invention for measuring differential pressures, as produced by a venturi 110 or equivalent construction in a flow line 111. Assuming flow in line 111 is from left to right, liquid 114 in left-hand leg 112 of the manometer, provided with a reservoir section 113 including an adjustable mass or block 115, will rise and fall with change in rate of flow through line 111. Measuring cell 121 is interconnected with reservoir 113 by U-tube 116, while the upper end of cell 121 is interconnected by tubes 117 and 118 to the opposite, or right-hand side, of the venturi 110. Thus, the upper portion of cell 121 is subjected to the flow-line pressure on the right-hand side of venturi 110. In accordance with the present invention, this pressure is also applied to the upper section of a comparison cell 121A by tube 120. Thus, the liquid in cells 121 and 121A is subjected to the same pressure and the upper unimmersed portions of the resistance elements of the cells are exposed to the same ambient conditions of temperature and gas or vapor composition.

The differential pressure detected by the manometer of Fig. 4 is measured in a manner quite similar to that described in connection with Figs. 1 and 3. The pressure-detecting bridge includes the resistance elements 125, 125A of cells 121, 121A which form two arms of a bridge, while resistances 146, 147, 148 and slidewire 129 form the other two arms. Resistor 147 is constructed of nickel or similar material for compensation of variations in ambient temperature similar to resistor 47 (Fig. 1). In the arrangement of Fig. 4, the bridge is illustrated as energized from a D. C. source, such as battery 127, through an adjustable resistance 128 and unbalance of the bridge is detected by galvanometer 131 or equivalent.

The rise and fall of liquid in tube 121 may be measured in one of several ways. In one method, movable contact 130 of slidewire 129 is adjusted for null response of galvanometer 131. With the bridge at balance, the differential pressure is indicated by the position of movable contact 130 with respect to a calibrated scale 133 associated with slidewire 129. Alternatively, with zero pressure differential across the manometer, the slidewire 129 is adjusted for null response of meter 131. Thus, any subsequent deviation of liquid level in cell 121 may be read directly on a calibrated scale on meter 131. A further way is to adjust, by means of knob 122 and threaded shaft 119, the position of block 115 in reservoir section 113 to maintain the level of liquid in cell 121 at the same level as the liquid in cell 121A as indicated by a null response of meter 131. The position of the block 113, indicative of the pressure differential applied to the manometer, may be determined by means of scale 123 and associated collar index 123A secured to shaft 119. The resistor 132 is a compensating resistor serving the purpose of resistor 45 of Fig. 1.

In Fig. 5, there is illustrated a modification of the arrangement of Fig. 3.

In Fig. 5, the barometer including reservoir 10, tube 11 and cells 21 and 21A is similar in arrangement and function to the embodiment illustrated in Fig. 3. In Fig. 5, there is provided an alternative arrangement for automatically leveling reservoir 10 to maintain the level of mercury 12 therein continuously in contact with the end of pin 13. A drive means comprising motors 70 and 71 drives a differential gear means 72 which in turn drives shaft 73 and bevel gears 74 and 75 to adjust screw 76. Screw 76 in turn raises or lowers support member 14 for reservoir 10. Motor 71 is continuously energized from supply lines 80, 81, while motor 70 is either energized or deenergized, depending upon whether or not connection to line 80 is completed through the mercury column and pin 13. The energizing circuit for motor 70 may be traced from line 80 through line 82, contact 83A of switch 83, line 84, pin 13, the mercury 12 in reservoir 10 and tube 11, electrode 85 disposed in tube 11, and line 86 to one terminal of motor 70. The opposite terminal of motor 70 is connected to line 81 by line 87.

In operation, motor 71 operates continuously in sense to raise the reservoir 10, while motor 70 operates intermittently in sense to lower the reservoir 10. The rate at which motor 70 can lower the reservoir 10 is slightly greater than that at which motor 71 can raise the reservoir. The level of mercury 12 is thus held as near to the end of the pin 13 as possible without undue oscillation of the driving gears, screw 76 and reservoir 10.

In the embodiment of Fig. 5, provision is also made for automatically maintaining the level of mercury in the measuring cell 21 at a predetermined height during standardization of the measuring network. This is accomplished by providing cell 21 with a contact pin 90 connected by line 91 to contact 83B of switch 83. With switch 83 thrown to engage contact 83B, the energizing circuit for motor 70 is completed from line 80 through line 82, switch contact 83B, line 91, pin 90, mercury in cell 21 and cell 11, electrode 85 and line 86. With motor 70 so energized, reservoir 10 will be raised and lowered to maintain the level of mercury in cell 21 nearly continuously in contact with pin 90 during the calibrating operation. Calibration is effected by manually adjusting slidewires 255, 256 to effect correspondence between the varying height of mercury in cell 21 and the values indicated by pointer 65. Slidewire 255 and resistor 254 form a potential-dividing network similar to resistor 54 and slidewire 55 of Fig. 1.

In the arrangement of Fig. 5, the measuring circuit is similar to that illustrated in Fig. 1 with the exception that a different provision is made to compensate for variations in ambient temperature as they affect the output of the bridge circuit including cell-resistance elements 25 and 25A. In Fig. 1, a temperature-sensitive resistor 47 is included to compensate for differences in ambient temperature. However, such compensation is perfect or complete only when the liquid level in both cells is the same. Since in the system of Fig. 5, unlike that of Fig. 3, the level in cell 21 is different for different applied pressures, it is desirable to provide compensation which is substantially perfect throughout a substantial range of variation of level in cell 21.

To accomplish such desired temperature compensation, there is provided an additional bridge circuit 100 comprising resistors 101, 102 and 103 of manganin or other material having a negligible temperature coefficient of resistance, and a resistance 104 of nickel, or other material, having a relatively high temperature coefficient of resistance. Input terminals A, C of bridge 100 are connected to secondary winding 105 of supply transformer 106, while the output terminals B and D of bridge 100 are connected in series with a slidewire 109, current-limiting resistor 108 and secondary winding 107 of transformer 106.

It will be observed that slidewire 109, shunted by fixed resistance 109S, is primarily energized through current-limting resistor 108 and secondary winding 107. However, in this energizing circuit there is included a pair of shunt paths through bridge 100, the first of which is provided between terminals B and D by resistors 102 and 103, while the second is provided by resistors 101 and 104. Assuming that each of the resistances in bridge 100 is equal at normal ambient temperature, the voltage appearing across slidewire 109 and shunt resistance 109S is due entirely to the voltage developed in secondary winding 107 of transformer 106. However, if there be, for example, a rise in ambient temperature, the resistance of nickel resistor 104 increases so that there is a different distribution of current through the two shunt paths of bridge 100; specifically, more current flows through resistors 102 and 103 than through resistors 101 and 104. Thus, an output voltage corresponding to the change in ambient temperature appears between terminals B and D of the bridge 100. This voltage will either be in-phase or 180° out-of-phase with the voltage developed by winding 107, depending upon the sense of the change in ambient temperature, thereby increasing or decreasing the comparison voltage supplied to slidewire 109. The effect of including the temperature-compensating resistor 104 in bridge 100 is to produce a greater change in voltage across slidewire 109 for a given change in ambient temperature. In so varying the supply voltage across slidewire 109, the output of the balanceable measuring bridge is modified to a greater degree than would be possible by including a temperature-compensating resistor in the potentiometer measuring circuit or in the pressure-detecting bridge, i. e., the compensation is more perfect over a greater range of variation of ambient temperature.

The contact 111 of slidewire 109 is adjusted by mechanical relay MR, or equivalent, automatically to balance the effecitve output of the cell bridge. The operation of the measuring circuit is otherwise similar to that described in connection with Fig. 1.

While numerous modifications and changes may be made in the apparatus disclosed in the foregoing embodiments of the invention, all such modifications and changes which are within the scope of the appended claims are intended to be included thereby.

What is claimed is:

1. In combination, a liquid reservoir, a manometer tube extending into said reservoir, an electrically-heated temperature-sensitive response member extending along the upper portion of said tube, said response member being partially submerged in but electrically-insulated from said liquid when the liquid enters said tube, means connecting the closed upper end of a comparison cell for communication with the closed upper end of said manometer tube, a similar electrically-heated temperature-sensitive response member extending along the upper portion of said comparison cell, and a bridge circuit including said response members in adjacent arms thereof for detecting changes in liquid level in said manometer tube as an indication of a change in the pressure measured by said manometer tube.

2. In combination, a reservoir adapted to contain a liquid, a manometer tube adapted to extend into said reservoir, a resistance member extending along the upper portion of said tube, said member being partially submerged in said liquid and electrically-insulated therefrom, a comparison cell having its closed upper end communicating with the closed upper end of said manometer tube, a similar resistance member extending along said comparison cell and partially submerged in the liquid therein, a bridge circuit including said resistance members in adjacent arms thereof, and means for measuring the unbalance of said arms due to a change in level of liquid in said manometer tube as an indication of a change in the physical condition measured by said manometer tube.

3. A barometer comprising a liquid reservoir, a barometer tube positioned in said reservoir, an electrically heated and insulated temperature-sensitive resistance wire positioned substantially axially in said tube and extending into the evacuated space above a liquid column in said tube, a comparison cell having its upper end interconnected with the upper end of said barometer tube and having axially disposed therein an insulated resistance wire extending through a substantially similar length of evacuated space above a liquid column within said comparison tube, and means for detecting variations in barometric pressure including a balanceable circuit for measuring variation in resistance of said wires due to variations in the height of liquid in said barometer tube as a measure of barometric pressure.

4. In an instrument for detecting changes in barometric pressure including a liquid barometer tube, the improvement which comprises a comparison tube having its upper end interconnected with the evacuated portion of said barometer tube and containing a liquid, elongated temperature-sensitive resistance wires of substantially the same length respectively positioned in said comparison tube and said barometer tube, said wires being insulated and extending above and below the liquid-vacuum interfaces of said tubes, and an electrical circuit for detecting and comparing variations in resistance of said wire in said barometer tube with said wire in said comparison tube as a measure of changes in barometric pressure.

5. A manometer system comprising a pair of cells respectively serving as measuring and comparison cells, said cells being partially filled with liquid and having a tube directly interconnecting the closed upper ends of said cells above the liquid columns therein to subject the upper ends of the liquid columns to the same ambient conditions of pressure, temperature and gas composition, the lower end of said comparison cell being sealed, a reservoir of liquid connected to the lower end of said measuring cell and exposed to a pressure different from the pressure in the interconnected closed upper ends of said cell to effect a difference between the liquid levels of said cells, said cells having longitudinally extending therein temperature sensitive resistors electrically-insulated and thermally-conductive with respect to the liquid of said cells, the resistance of said resistors being respectively dependent upon the liquid levels of their associated cells, and electrical measuring means including a bridge having said resistors of said cells in adjacent arms thereof.

6. A manometer system as in claim 5 in which the upper ends of said cells and their interconnection are substantially evacuated of air, and in which said reservoir of liquid is exposed to atmospheric pressure.

7. A manometer device comprising a pressure measuring cell and a comparison cell partially filled with liquid, said cells having longitudinally extending therein resistors electrically-insulated and thermally-conductive with respect to the liquid in said cells, the resistance of each of said resistors being dependent upon the level of liquid in the associated cell, a line interconnection between the closed upper ends of said cells to subject the liquid and the resistors thereof to the same ambient conditions of pressure, temperature and composition of gas above the liquid, the lower end of said comparison cell being sealed, and a reservoir of liquid connected to the lower end of said measuring cell and exposed to atmospheric pressure whereby the difference in liquid level of said cells and the difference in resistance of the cell resistors varies with changes of atmospheric pressure compensated for ambient conditions of temperature and gas composition to which the cells are subjected.

References Cited in the file of this patent

UNITED STATES PATENTS

| | | |
|---|---|---|
| 1,922,882 | Chatfield | Aug. 15, 1933 |
| 2,103,741 | Bencowitz | Dec. 28, 1937 |
| 2,328,954 | Conley | Sept. 7, 1943 |

FOREIGN PATENTS

| | | |
|---|---|---|
| 521,102 | France | Feb. 28, 1921 |
| 626,650 | Great Britain | July 19, 1949 |